US006412644B1

(12) United States Patent
Crabbe et al.

(10) Patent No.: US 6,412,644 B1
(45) Date of Patent: Jul. 2, 2002

(54) VIBRATORY SEPARATOR

(75) Inventors: Mark D Crabbe, Spring, TX (US);
David L. Schulte, Broussard, LA (US);
Charles N. Grichar, Houston, TX (US)

(73) Assignee: Varco I/P, Inc., Houston, TX (US)

( * ) Notice: Subject to any disclaimer, the term of this patent is extended or adjusted under 35 U.S.C. 154(b) by 1 days.

(21) Appl. No.: 09/723,740

(22) Filed: Nov. 28, 2000

Related U.S. Application Data

(63) Continuation-in-part of application No. 09/716,176, filed on Nov. 17, 2000.

(51) Int. Cl.[7] ................................................ B07B 1/30
(52) U.S. Cl. ...................... 209/309; 209/311; 209/314; 209/317; 209/326; 209/332; 209/275
(58) Field of Search ................................ 209/274, 275, 209/309, 311, 313, 314, 315, 319, 317, 325, 326, 331, 332, 400, 401, 403; 210/384, 388, 389, 497.01

(56) References Cited

U.S. PATENT DOCUMENTS

| 964,897 A | 7/1910 | Bryant |
| 2,089,548 A | * 8/1937 | Frantz et al. ............... 210/389 |

(List continued on next page.)

FOREIGN PATENT DOCUMENTS

| DE | 3601671 A1 | * 7/1987 |
| EP | 0 169698 | 1/1986 |
| GB | 1575312 | 9/1980 |
| GB | 1578948 | 11/1980 |
| GB | 2085744 | 5/1982 |
| GB | 2161715 | 1/1986 |
| GB | 2162091 | 1/1986 |
| GB | 2206501 | 1/1986 |
| GB | 2175222 | 11/1986 |
| GB | 2312858 | 11/1997 |
| IT | EP 0 238 455 A2 | * 9/1987 |
| JP | 54049787 A | * 4/1979 |

OTHER PUBLICATIONS

Derwent Abstract 1983–825074 (Abstracted Pub.: SU 989104A; Pub. Date: Jan. 1983; Inventor: Kostyuchen et al.).*
"The Rigth Screen Makes the Difference", Oilfields Solids Control Div., CPI Group Inc., 14pp.&cover 1990.
"Filtration & Separation," The Container Filter, 13 pp. & cover, Flo Trend Systems, Inc. 1989.
"Separation Through Technology—Composite Catalog," Brandt EPI, 02/96.
"Mud Equipment Manual, Handbook 3: Shale Shakers," Brandt et al, gulf Publishing Co.,pp. 3–1–3–9, 1976.
"New Screening Development U.S. Pat. No. 4,634,535," 3pp., Flo Trend Systems, Inc. 1990.
U.S. Patent Application entitled Screen Basket For Shale Shakers naming as co–inventors David L. Schulte, Jr. and Charles N. Grichar and co–owned with the present application(09/716,176, filed Nov. 17, 2000).

*Primary Examiner*—Donald P. Walsh
*Assistant Examiner*—Joseph C Rodriguez
(74) *Attorney, Agent, or Firm*—Guy McClung

(57) ABSTRACT

A vibratory separator for separating components of material introduced to the vibratory separator, the vibratory separator including a basket for holding screening apparatus, the basket having two sides spaced-apart by a first end at which the material is introduced into the basket and a second end spaced-apart from the first end, certain components separated from the material exiting the basket from the second end, vibrating apparatus connected to the basket for vibrating the basket, screening apparatus mounted in the basket, the screening apparatus having at least a first portion and a second portion, the first portion lower in the basket than the second portion, and receptacle apparatus below the screening apparatus for receiving material components flowing through the screening apparatus.

12 Claims, 7 Drawing Sheets

U.S. PATENT DOCUMENTS

| | | | | |
|---|---|---|---|---|
| 2,648,441 | A | 8/1953 | Soldan | |
| 2,910,183 | A | 10/1959 | Hayes | |
| 2,973,865 | A * | 3/1961 | Cibula | 209/315 |
| 3,747,770 | A | 7/1973 | Zentis | |
| 3,815,473 | A | 6/1974 | Jones, Jr. | |
| 3,929,642 | A | 12/1975 | Ennis et al. | |
| 3,968,033 | A * | 7/1976 | Illeman et al. | 209/403 |
| 3,970,549 | A | 7/1976 | Ennis et al. | |
| 4,033,865 | A | 7/1977 | Derrick, Jr. | |
| 4,064,051 | A * | 12/1977 | Wehner | 210/389 |
| 4,065,382 | A | 12/1977 | Derrick, Jr. | |
| 4,085,776 | A | 4/1978 | Derrick, Jr. | |
| 4,224,146 | A | 9/1980 | Kent et al. | |
| 4,306,974 | A | 12/1981 | Harry | |
| 4,375,199 | A | 3/1983 | Graeme-Barber et al. | |
| 4,446,022 | A | 5/1984 | Harry | |
| 4,457,839 | A | 7/1984 | Bailey | |
| 4,526,121 | A | 7/1985 | Shudo et al. | |
| 4,575,421 | A | 3/1986 | Derrick et al. | |
| 4,603,653 | A | 8/1986 | Bews | |
| 4,634,535 | A | 1/1987 | Lott | |
| 4,728,422 | A | 3/1988 | Bailey | |
| 4,744,898 | A | 5/1988 | Bailey | |
| 4,819,809 | A | 4/1989 | Derrick | |
| 4,820,407 | A | 4/1989 | Lilie | |
| 4,846,352 | A | 7/1989 | Bailey | |
| 4,857,176 | A | 8/1989 | Derrick et al. | |
| 4,882,054 | A | 11/1989 | Derrick et al. | |
| 5,137,622 | A | 8/1992 | Souter | |
| 5,211,291 | A | 5/1993 | Kelley et al. | |
| 5,221,008 | A | 6/1993 | Derrick, Jr. et al. | |
| 5,248,043 | A | 9/1993 | Dorn | |
| 5,326,460 | A * | 7/1994 | Cheeseman et al. | 210/160 |
| 5,330,057 | A | 7/1994 | Schiller et al. | |
| 5,332,101 | A | 7/1994 | Bakula | |
| 5,417,793 | A | 5/1995 | Bakula | |
| 5,417,858 | A | 5/1995 | Derrick et al. | |
| 5,417,859 | A | 5/1995 | Bakula | |
| 5,494,173 | A | 2/1996 | Deister et al. | |
| 5,614,094 | A | 3/1997 | Deister et al. | |
| 5,626,234 | A | 5/1997 | Cook et al. | |
| 5,636,749 | A | 6/1997 | Wojciechowdki | |
| 5,667,661 | A | 9/1997 | Hughes | |
| 5,720,881 | A | 2/1998 | Derrick et al. | |
| 5,783,077 | A | 7/1998 | Bakula | |
| 5,819,952 | A | 10/1998 | Cook et al. | |
| 5,868,929 | A | 2/1999 | Derrick et al. | |
| 5,876,552 | A | 3/1999 | Bakula | |
| 5,921,399 | A | 7/1999 | Bakula et al. | |
| 5,927,511 | A | 7/1999 | Riddle et al. | |
| 5,944,197 | A | 8/1999 | Baltzer et al. | |
| 5,944,993 | A | 8/1999 | Derrick et al. | |
| 5,958,236 | A | 9/1999 | Bakula | |
| 5,967,336 | A | 10/1999 | Baltzer et al. | |
| 6,000,556 | A | 12/1999 | Bakula | |
| 6,053,332 | A | 4/2000 | Bakula | |
| 6,062,394 | A * | 5/2000 | Bielagus | 209/320 |
| 6,143,183 | A * | 11/2000 | Wardwell et al. | 210/739 |
| 6,161,700 | A | 12/2000 | Bakula | |
| 6,220,448 | B1 | 4/2001 | Bakula et al. | |
| 6,241,900 | B1 | 6/2001 | Nakumura et al. | |
| 6,269,954 | B1 | 8/2001 | Baltzer | |
| 2002/0000399 | A1 * | 1/2002 | Winkler et al. | 209/399 |

* cited by examiner

VIBRATORY SEPARATOR

RELATED APPLICATION

This is a continuation-in-part of pending U.S. patent application Ser. No. 09/716,176 filed on Nov. 17, 2000 entitled "Screen Basket For Shale Shakers" naming as co-inventors David L. Schulte, Jr. and Charles N. Grichar, co-owned with the present invention and present application and incorporated fully herein for all purposes

BACKGROUND OF THE INVENTION

1. Field of the Invention

This invention is directed to vibratory separators; shale shakers; screens and screen assemblies for them; and methods of their use.

2. Description of Related Art

Vibrating screens have been employed for many years to separate particles in a wide array of industrial applications. One common application of vibrating screens is in drilling operations to separate particles suspended in drilling fluids. The screens are mounted generally horizontally on a vibrating mechanism or shaker that imparts a desired motion to the screen. Material from which particles are to be separated is poured onto a back end of the vibrating screen, usually from a pan mounted above the screen. The material generally flows toward the front end of the screen. Large particles are unable to move through the screen remaining on top of the screen and moving toward the front of the screen where they are collected. The smaller particles and fluid flows through the screen and collects in a tank, receptacle or pan beneath the screen.

Typically a vibrating screen is resiliently suspended or mounted upon a support and is caused to vibrate by a vibrating mechanism, e.g. an unbalanced weight on a rotating shaft connected to a basket or frame. The screen is vibrated by vibratory equipment to create a flow of trapped solids on top surfaces of the screen for removal and disposal of solids. The fineness or coarseness of the mesh of a screen may vary depending upon mud flow rate and the size of the solids to be removed.

The need for solids control in drilling mud used in hydrocarbon well drilling is well known in the prior art. Drilling mud, typically a mixture of clay and water and various additives, is pumped down through a hollow drill string (pipe, drill collar, bit, etc.) into a well being drilled and exits through holes in a drillbit. The mud picks up cuttings (rock) and other solids from the well and carries them upwardly away from the bit and out of the well in a space between the well walls and the drill string. At the top of the well, the solids-laden mud is discharged over a shale shaker, a device which typically has a screen or a series of screens arranged in tiered or flat disposition with respect to each other. The prior art discloses a wide variety of vibrating screens, devices which use them, shale shakers, and screens for shale shakers. The screens catch and remove solids from the mud as the mud passes through them. If drilled solids and/or debris are not removed from the mud used during the drilling operation, recirculation of the drilled solids can create weight, viscosity, and gel problems in the mud, as well as increasing wear on mud pumps and other mechanical equipment used for drilling.

In many cases it is difficult if impossible to mount or hang a screen S in a vibratory separator or shale shaker so that the lateral plane of its surface is perfectly horizontal. Either the center of the screen bulges upward laterally from the longitudinal edges of the screen as shown in FIG. 1 (an "over slung" screen as described in U.S. Pat. No. 4,820,407, incorporated fully herein), in which case the screen is said to be "crowned" or "over slung", or the center bulges downward in which case the screen is said to be "under slung". A screen that is "crowned" or "over slung" (FIG. 1), causes solids to tend to congregate at the screen's longitudinal edges; if a screen is "under slung", solids tend to congregate at its center.

FIG. 2 shows a typical prior art vibratory separator system A with a screen B (with screen or screening cloth or mesh as desired) according to the present invention mounted on vibratable screen mounting apparatus or "basket" C. The screen B may be any screen disclosed herein or have any combination of any feature or features of any screen or screen part disclosed herein; and any such screen may be used with any appropriate shaker or screening apparatus. The basket C is mounted on springs I (only two shown; two as shown are on the opposite side) which are supported from a frame D. The basket C is vibrated by a motor E and interconnected vibrating apparatus F which is mounted on the basket C for vibrating the basket and the screens. Elevator apparatus G provides for raising and lowering of the basket end. The screen B is any prior art screen, screens, and/or screen assembly.

FIG. 3 shows a prior art screen mounting basket J with a screen K mounted therein with a typical prior art "crown" disposition with a middle crown portion L. Typical mounting rails or channels M are used with typical mounting devices N to releasably secure the screen K in the basket J.

There has long been a need recognized by the present inventor for a vibratory separator screen which overcomes the problems of prior art crowned screens.

SUMMARY OF THE PRESENT INVENTION

The present invention discloses, in at least certain embodiments, screens and screen assemblies for vibratory separators (including, but not limited to screens for shale shakers for treating drilling fluid or "mud") and vibratory separators with such screens and screen assemblies. In certain aspects screen assemblies according to the present invention have one or more screening members (screen, mesh, perforated plate, etc.) with a top surface that is higher in the middle than at one or both ends, i.e., when viewed from the side one or both ends of the screen assembly are at a level below the screen assembly's middle. In certain aspects the surface tapers from the middle down to the end(s). The "ends" of the screen assembly are a first end onto which material to be treated (e.g., but not limited to, drilling fluid from which mud is to be filtered) is introduced to the screen assembly and a second end from which separated material (e.g., but not limited to, solids like drilled cuttings and/or debris) exits from the vibratory separator.

In certain particular embodiments an exit end of such a screen assembly is positioned over a lower screen assembly and separated solids (which may still have some liquid therein) fall down onto the lower screen. The lower screen may be any known two- or three-dimensional screen and it may be, in particular aspects formed with a higher middle and one or both lower ends according to the present invention.

Any screen or screen assembly known in the prior art may be formed according to the present invention with a relatively higher middle and with one or both ends lower than the middle (in side view).

In certain embodiments the present invention discloses a vibratory separator with a screen or screens according to the present invention as described herein.

In other aspects a screen is mounted in a basket or screen cradle of a vibratory separator so that part of the screen is higher than one or both ends. In one aspect such a screen has sufficient flexibility to be bent into a desired configuration; in other aspects the screen is made in the desired configuration or multiple sub-screens and/or screen parts are positioned in the desired shape. Screens mounting or holding devices or apparatuses are used to hold the screen or screens in the desired shape (viewed from the side).

To the extent more screening area is available with a screen assembly according to the present invention, screening efficiency and capacity are increased.

In certain aspects, the present invention discloses a vibratory separator for separating components of material introduced to the vibratory separator (which in one aspect is a shale shaker for separating drilling fluid from a mixture of drilling fluid, drilled cuttings, debris, etc.), the vibratory separator having a basket for holding screening apparatus; vibrating apparatus for vibrating the screening apparatus; screening apparatus mounted in the basket, the screening apparatus having at least a first portion and a second portion, the first portion lower in the basket than the second portion, and receptacle apparatus below the screening apparatus for receiving material components flowing through the screening apparatus.

With a vibratory separator according to the present invention a pond or pool can be formed at, e.g., the first screen end at which material is introduced to the vibratory separator. In certain aspects this pool has a relatively increased pressure head that drives liquid through screen adjacent the pool. The size of the pool can be adjusted by adjusting the height of the screen end. Apparatus may be provided to adjust screen end height in a basket to adjust pool depth and size.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, nonobvious devices and methods for vibratory separators and shale shakers;

Such separators and shakers with a screen or screens mounted therein with at least one end part lower than other parts of the screen when viewed from the side;

Such separators and shakers with such a screen above an end of which forms a pool of material to be treated by the separator or shaker; and New, useful, unique, efficient and nonobvious screens and screen assemblies for such separators and shakers;

Such screens and screen assemblies with a "crown" in the middle when viewed from a side; and New, useful, unique, efficient and nonobvious methods for using such separators, shakers, and screens.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

Figure 4A:
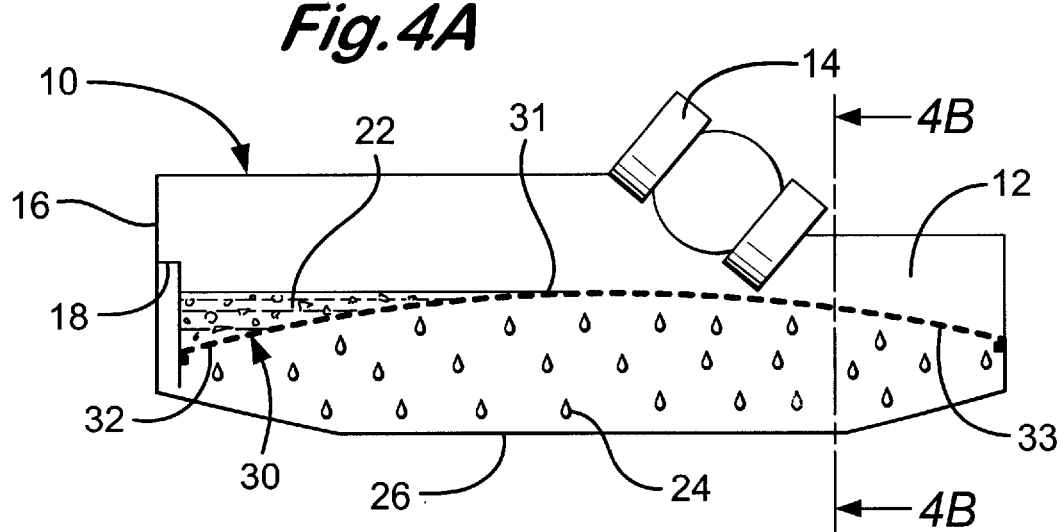
FIG. 4A is a side cross-section view of a vibratory separator and screen according to the present invention.
Figure 4B:
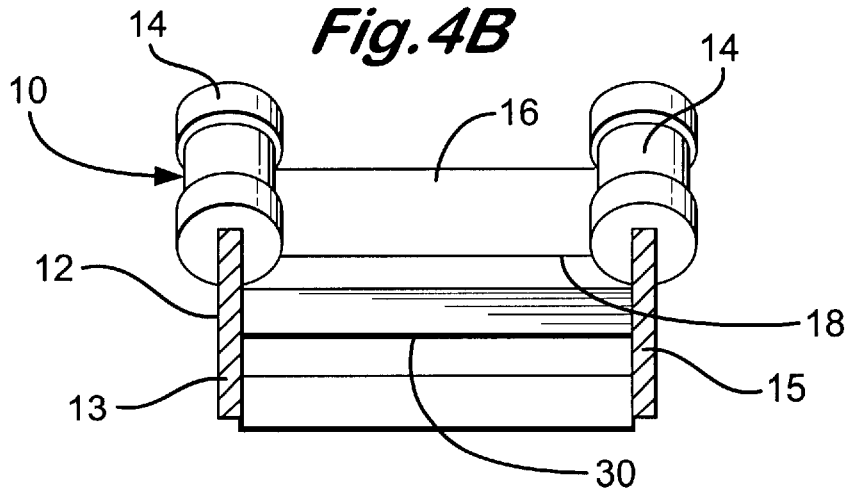
FIG. 4B is an end view of the vibratory separator of FIG. 4A.

FIGS. 4A and 4B show a vibratory separator 10 according to the present invention which has a screen mounting basket 12, vibrating apparatus 14 connected to the basket 12. Material to be treated by the vibratory separator 10 is introduced into a first end 16 of the basket 12 above a screen 30 releasably secured within the basket 12 by any suitable known screen securement device and/or structure. Item 18 is a typical back or rear weir.

The screen 30 has a central portion 31 which is higher than either screen end 32, 33. A pool 22 of material to be treated is above the screen end 31 and enclosed by sides 13, 15 and end 16 of the basket 12. Fluid 24 (e.g. but not limited to drilling fluid separated from drilled solids, cuttings and debris) separated from the material to be treated falls from the screen 30 into a receptacle or pan 26. Separated materials exit from the end 33 of the screen 30.

It is within the scope of this invention to adjust the height of the screen ends 32, 33 as desired and thereby to adjust the size and depth of the pool 22. This also permits adjustment of the location of the edge of the pool in relation to the discharge end of the screen so that solids can have a longer distance to move on the screen (while liquid escapes and moves through the screen) once they have left the pool. The screen(s) of baskets according to the present invention may be mounted to the basket in any known manner with any known screen mounting apparatus or device. In certain aspects a reverse hook strip tensioning system may be used at either end of the screen (i.e. at the ends of a basket) and, in one aspect, tension may be applied to a "live" end of the screen with the system at the basket's discharge end. In one particular aspect at the "live" end a normally open spring actuator is used which is selectively actuated to a closed position to tension and secure the screen. Such an actuator may be manually actuated or operated with appropriate hydraulic and/or pneumatic systems.

Figure 5A:
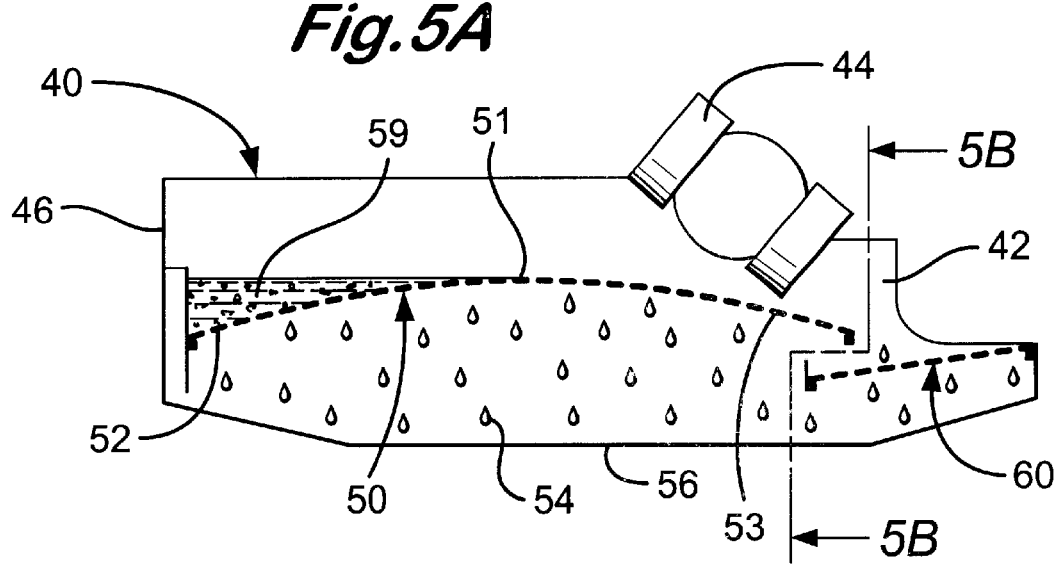
FIG. 5A is a side cross-section view of a vibratory separator and screen according to the present invention.
Figure 5B:
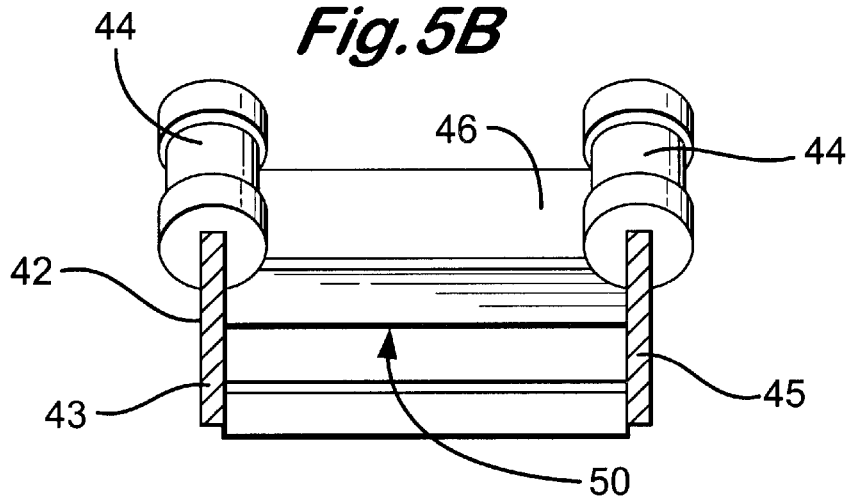
FIG. 5B is an end view of the vibratory separator of FIG. 5A.

FIGS. 5A and 5B show a vibratory separator 40 according to the present invention with a screen mounting basket 42, vibrating apparatus 44 connected to the basket 42. Material is introduced into a first end 46 of the basket 42 above a screen 50 releasably secured within the basket 42.

The screen 50 has a central portion 51 which is higher than either screen end 52, 53. A pool 52 of material to be treated is above the screen end 51 and enclosed by sides 43, 45 and end 46 of the basket 42. A screen 60 is located with part thereof beneath the end 53 of the screen 50 so that solids flow onto the screen 60 from the screen 50 for further separation of fluid from solids. Fluid (e.g. but not limited to drilling fluid separated from drilled solids, cuttings and debris) separated from the material to be treated falls from the screen 50 into a receptacle or pan 56. Separated materials on the screen top exit from the end 53 of the screen 50.

FIGS. 6 and 8A–9C show various screens according to the a present invention, each in a screen mounting basket 62 of a vibratory separator vibrated by vibrating apparatus 64. FIG. 7 shows a basket 63.

Figure 6:
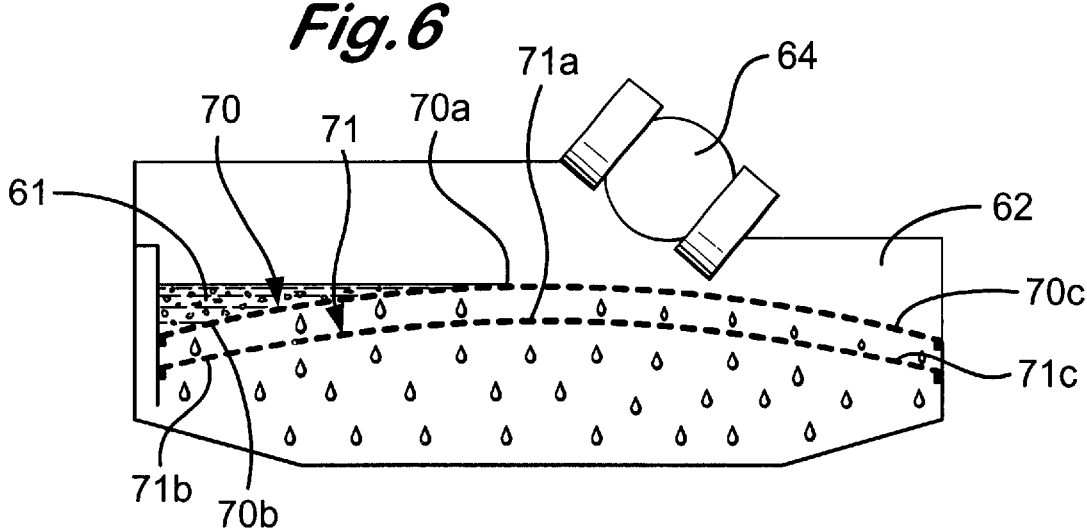
FIGS. 6–10 are side cross-section views of vibratory separators according to the present invention with screen(s) according to the present invention.
Figure 7:
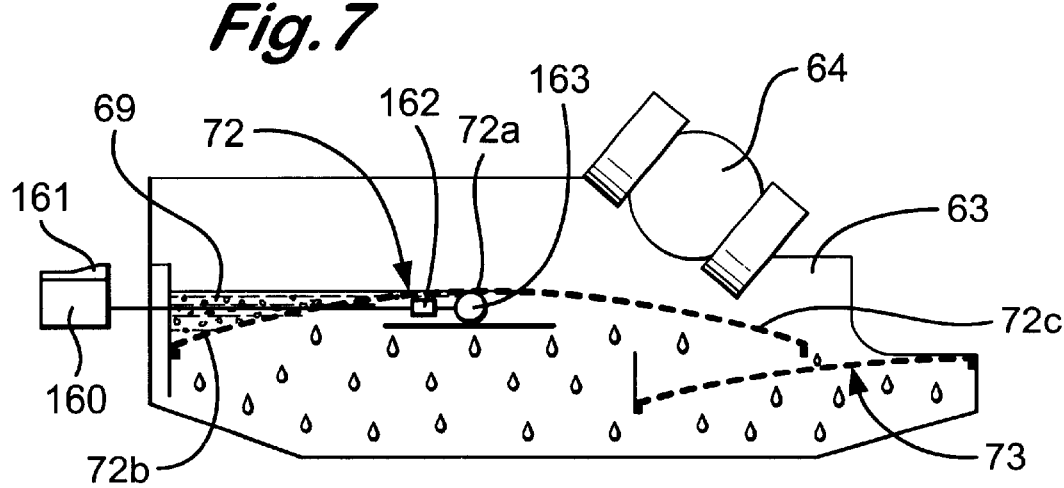

In the apparatus of FIG. 6, two screens 70, 71 are mounted one above the other, each with central portions 70a, 71a respectively which are above screen ends 70b, 70c and 71b, 71c, respectively. Optionally either screen may be deleted or may be substantially horizontal viewed from the sides and ends. A pool 61 is above the screen end 70b.

In FIG. 7 the apparatus has a screen 72 (like screen 50, FIG. 5A) with a middle portion 72a and an end 72c from which separated matreials fall onto a lower screen 73 which itself is curved rather than flat (as is the screen 60, FIG. 5A). As shown the lower screen 73 is convex (viewed from the side); but it is within the scope of this invention for the lower screen 73 to be concave as viewed from the side. A pool 63 of material to be treated is above an end 72b of the screen 72.

As shown schematically in FIG. 7, the "crown" or height of the screen 72 may be selectively adjusted by an inflatable bladder 163 with an appropriate inflation system 162 controlled by a system 160 with a control/monitor system 161. Alternatively crown height may be manually adjusted and screens thus adjusted held in place by any suitable means, including, but not limited to: nuts and bolts; support blocks, beams, or members; and/or recesses or grooves in side walls, with or without one or more screen projections or screen frame projections therein.

Figure 8A:
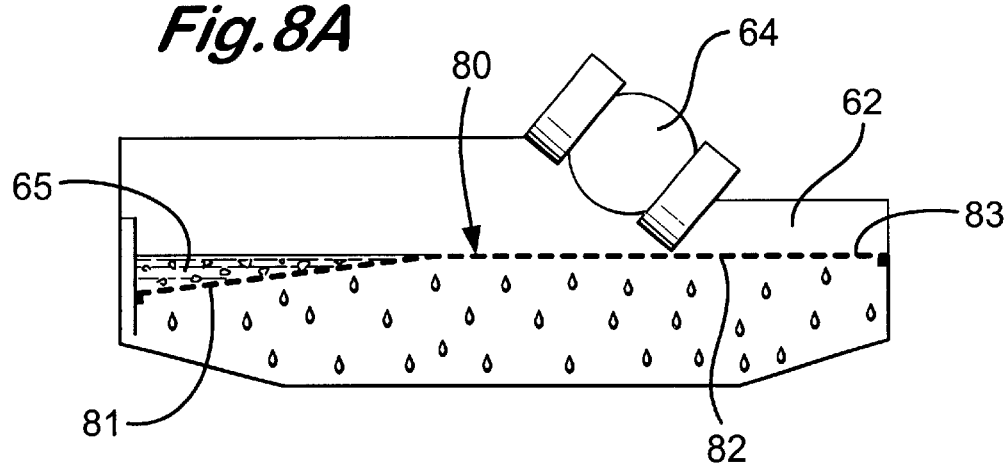

In the apparatus of FIG. 8A a screen 80 has a first end 81 which is lower than the remaining screen portion 82. A pool 65 of material to be treated is above the end 81. Solids o the screen top exit from a screen end 83.

Figure 8B:
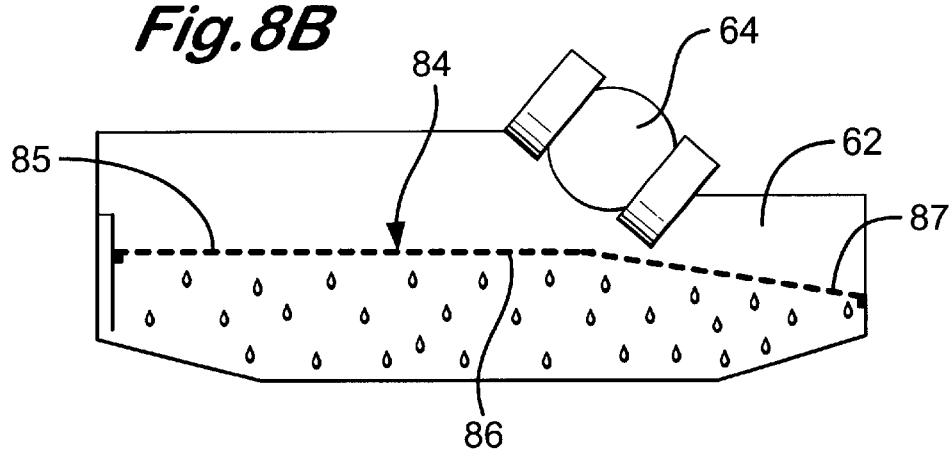
Figure 8C:
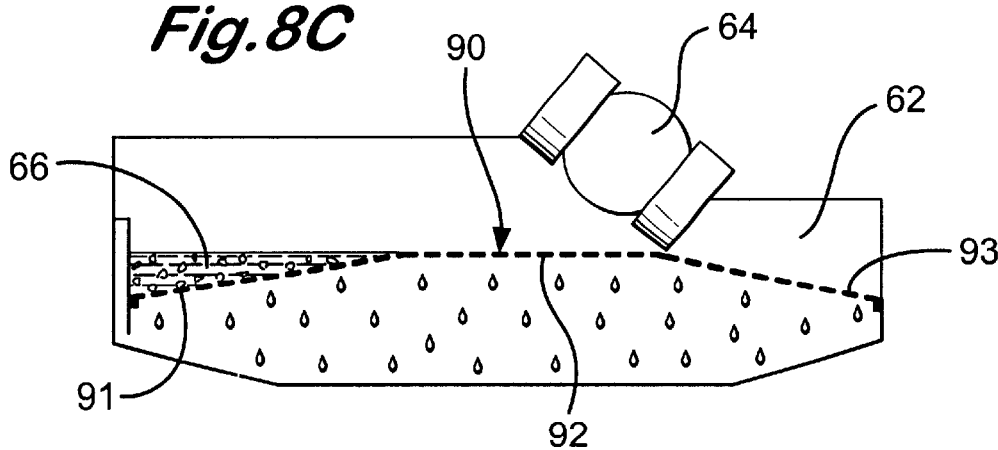

In the apparatus of FIG. 8B a screen 84 has a first end 85 and an exit end 87 which is lower than the end 85 and central screen portion 86. In the apparatus of FIG. 8C a screen 90 has a first end 91 and a second end 93 both of which are lower than a central screen portion 92. A pool 66 of material to be treated is above the end 91. Solids on the screen top exit from the screen end 93.

Figure 9A:
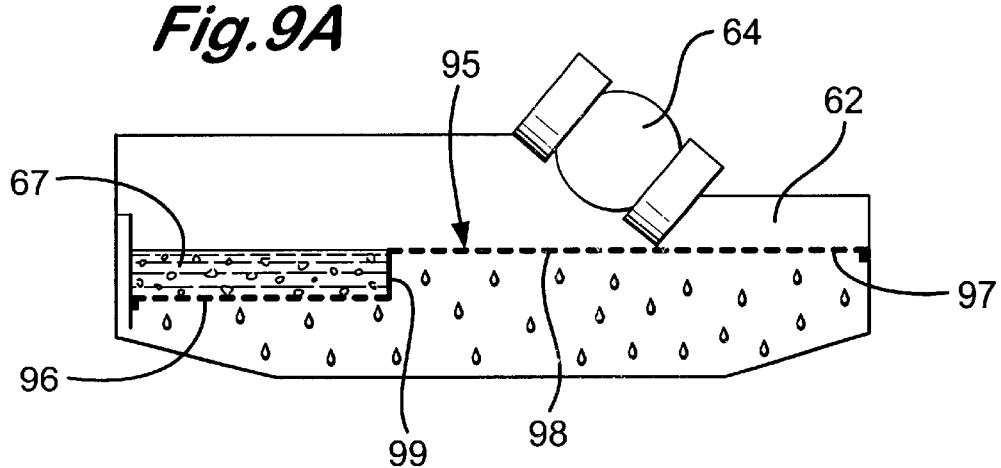

In the apparatus of FIG. 9A a screen 95 has a first end 96 which is lower than the remaining screen portions 97, 98. A pool 67 of material to be treated is above the end 96. Solids exit from a screen end 97. A connecting portion 99 can be either solid or perforated, and made of screen, mesh, or any suitable material.

Figure 9B:
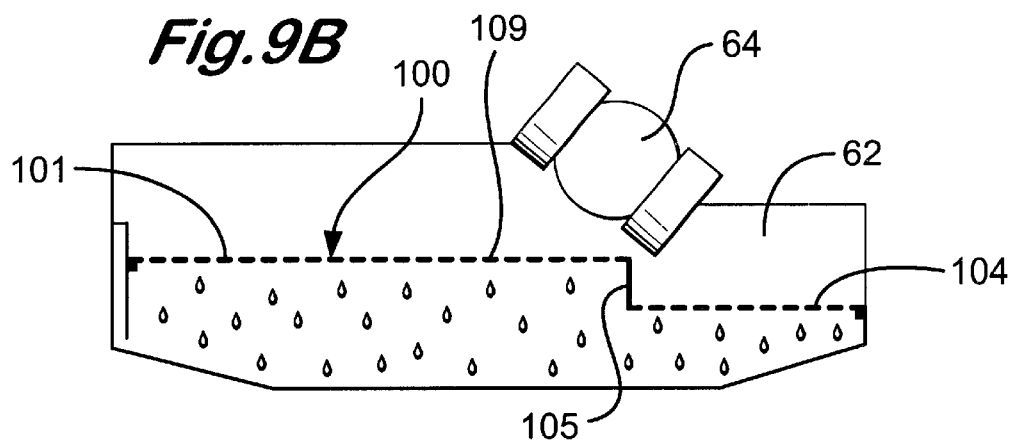

In the apparatus of FIG. 9B a screen 100 has a first end 101 and a central portion. 109 which are higher than a screen exit end 104. A connecting portion 105 is like the portion 99, FIG. 9A.

Figure 9C:
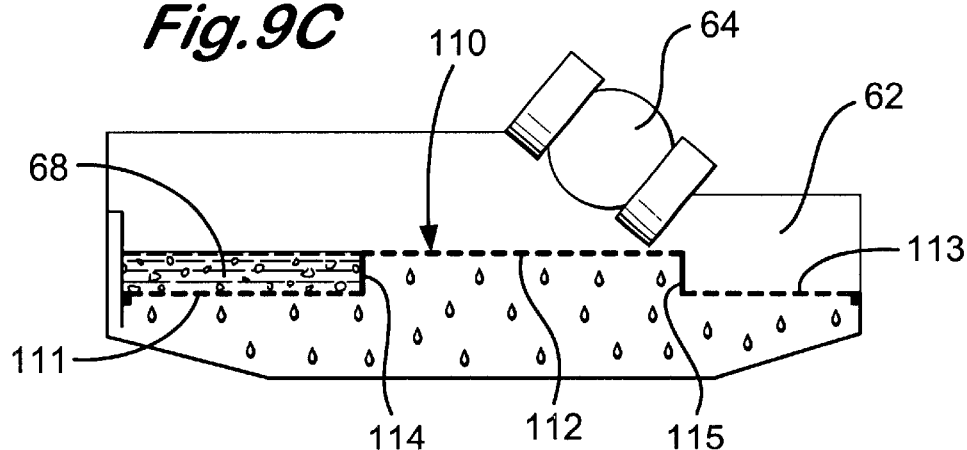

In FIG. 9C a screen 110 has a first end 111 lower than a central screen portion 112. A pool 68 of material is above the end 111. Solids exit from a screen end 113 which is also lower than the central portion 112. Connecting portions 114, 115 are like the portion 99, FIG. 9A.

Any screen or screen portion in any screen disclosed herein may be any known screen for a vibratory shaker, including, but not limited to, known two- and three-dimensional screens and screen assemblies. Any screen disclosed herein with portions at different levels may include a separate screen or screens for each portion, the multiple screens mounted adjacent each other in a basket.

In certain embodiments of the present invention a long single screen, initially flat, is bent to produce the "reverse crown" shape (e.g. the shape of the screen in FIG. 4A, viewed from the side or of FIGS. 8A–8C) and is secured in a basket.

In certain particular aspects a screen or screen assembly according to the present is used in place of any of the screens or screen assemblies disclosed in U.S. patent application Ser. No. 09/716,176 filed on Nov. 17, 2000 entitled "Screen Basket For Shale Shakers" naming as co-inventors David L. Schulte, Jr. and Charles N. Grichar, co-owned with the present invention and present application; incorporated fully herein for all purposes and copy submitted herewith as part hereof.

Figure 1:
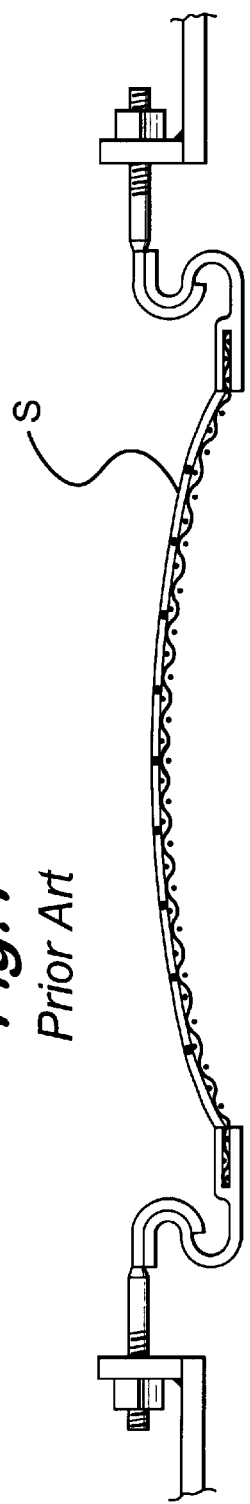
FIG. 1 is an end view of a prior art screen for mounting in a prior art vibratory separator.
Figure 3:
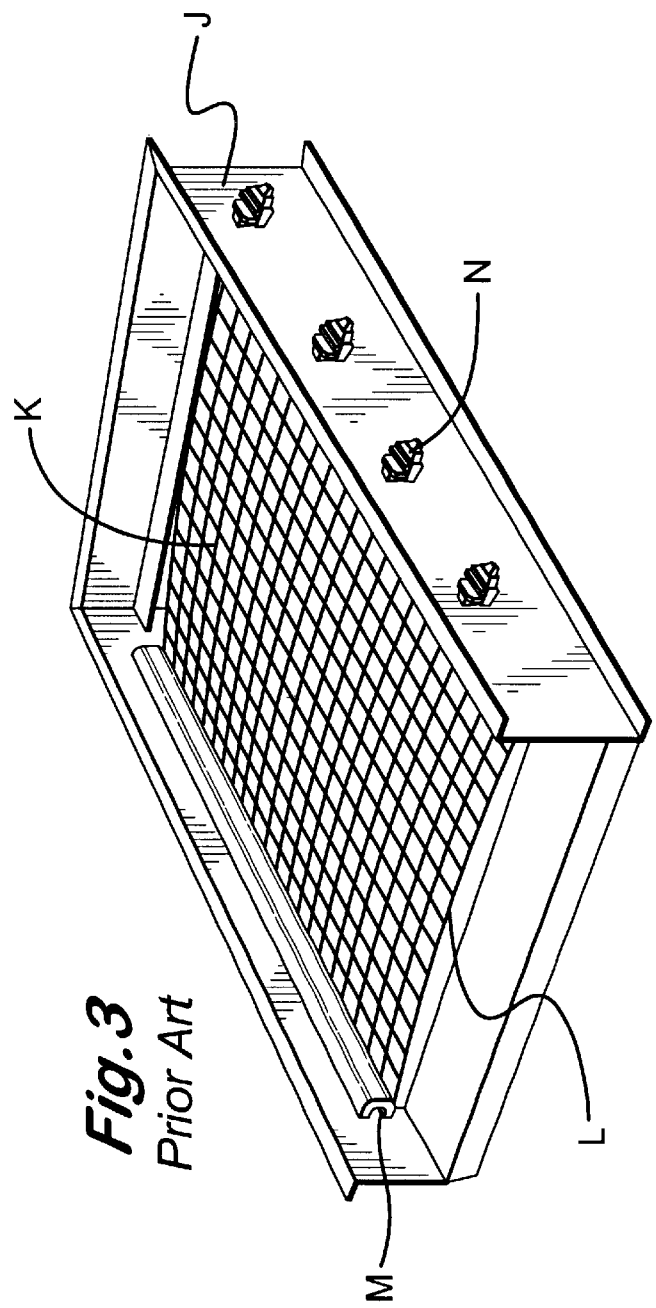
FIG. 3 is a perspective view of a prior art basket with a screen mounted therein.
Figure 2:
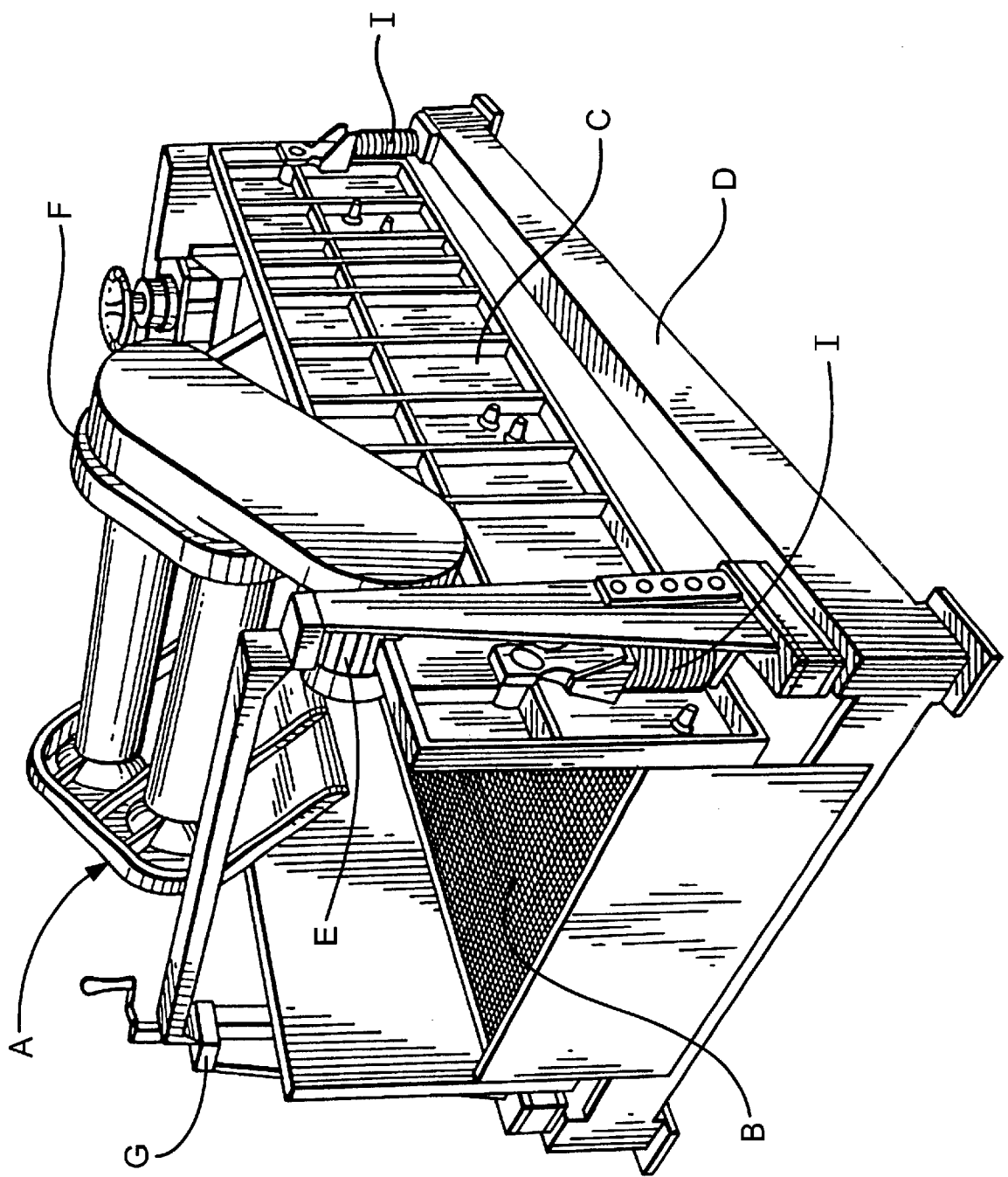
FIG. 2 is a perspective view of a prior art vibratory separator.
Figure 10:
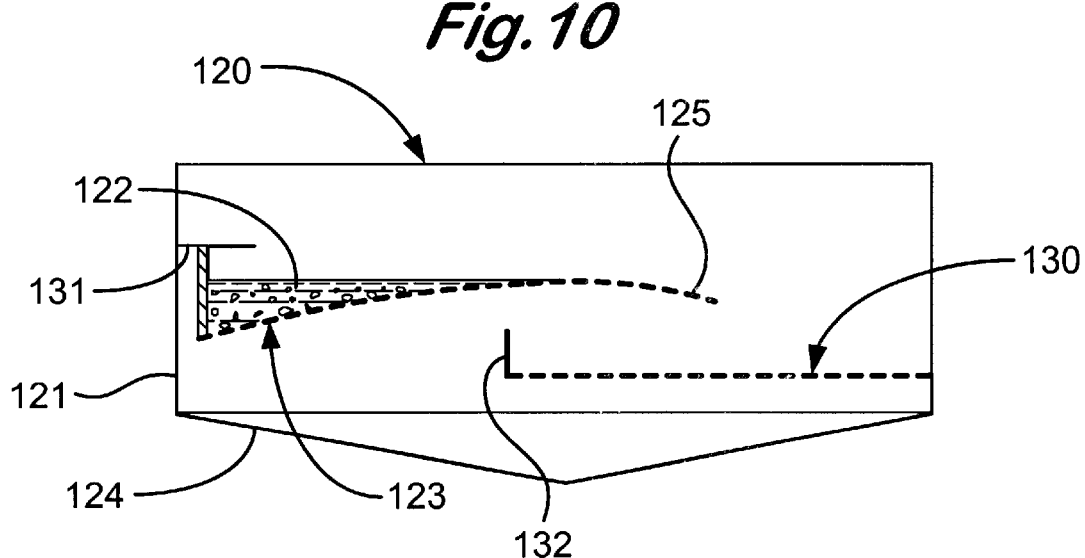

FIG. 10 shows a basket 120 for a vibratory separator or for a shale shaker (e.g. but not limited to apparatuses as shown in FIG. 2) with ends and side walls which may be like those of any basket described herein. Material to be treated is introduced at a first end 121 of the basket 20 where it forms a pool 122 above part of a screen 123 according to the present invention. (The screen 123 may be like the screens 31, 50, or 72 described above and with any suitable layer or layers of screening material and/or mesh, either two- or three-dimensional bonded together and/or mechanically connected together—as may be any screen or screen assembly herein). Fluid (e.g. but not limited to drilling fluid) separated from the pool 122 flows down into a collection receptacle 124. Fluid that exits the pool 122 in material on the screen top can move through the screen 123 and flow down to contact another screen 130 (which may be like any screen disclosed herein, including, but not limited to screens 60, 73, 87 or 93. Fluid separated by the screen 130 flows down into the collection receptacle 124.

A rear barrier or weir 131 contains one end of the pool 122. A barrier 132 (solid or made of screening material) may be used with the screen 130. As shown the barrier 132 may lie below the end of the pool 122 nearest the discharge end 125 of the screen 123. However, the barrier 132 may be positioned further under the pool 122 (to the left in FIG. 10) or closer to the discharge end 125 (to the right in FIG. 10). Also the screen 130 may extend across the entire length of the basket 120 or any part thereof. Instead of a barrier 131, a screen may be used.

Figure 11A:
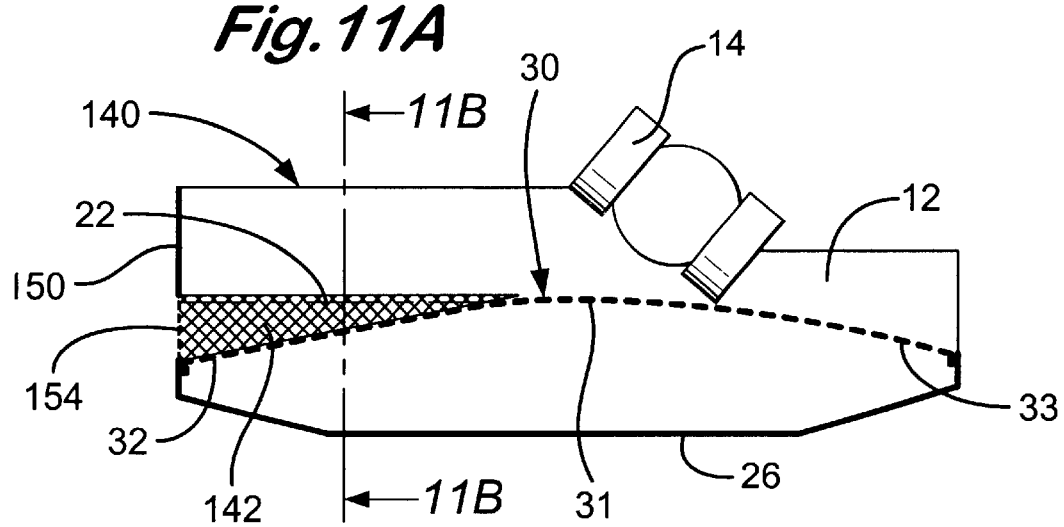
FIG. 11A is a side cross-section view of a vibratory separator according to the present invention with a basket according to the present invention.
Figure 11B:
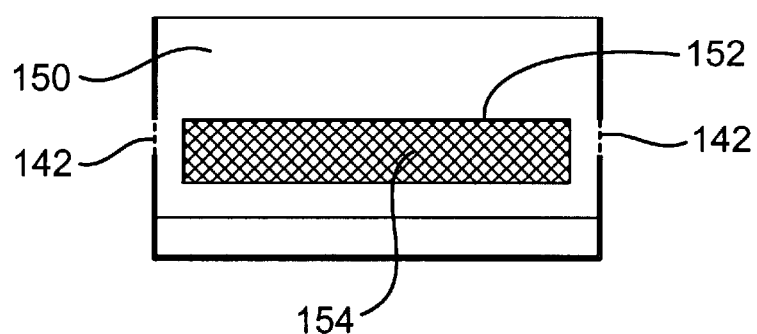
FIG. 11B is an end view of the basket of FIG. 11A.

FIG. 11A shows a vibrator separator or shale shaker 140 according to the present invention with a basket 150 according to the present invention (e.g., but not limited to like the apparatus of FIG. 4A; and like numerals indicate like parts and items). The sides of the shaker 140 include side screens 142 (one side shown in FIG. 11A) adjacent the pool 22. Either or both side screens 142 may be deleted. The side screen opposite the side screen 142 in FIG. 11A is the same as the side screen 142 shown. Optionally, the basket 150 has an end opening 152 and an end screen 154 adjacent the pool 22. The end screen and side screens may be like any described in the Schulte, Jr. et al pending application Ser. No. 09/716,176 referred to above. Such an end screen and/or side screen(s) may be used with any basket disclosed herein.

In a typical prior art apparatus, a pool formed on the top of the screen has a "horseshoe" or U-shape with side poolpotions along side edges of a screen and with the central raised part of the screen above the pool, or with the pool on a central screen portion relatively shallow compared to the pool at the screen's sides and end. A pool in a system according to the present invention (e.g., but not limited to any of the pools in FIGS. 4A–11A) extends from one side of the basket to the other with a uniform depth at any particular distance from the basket input end.

The present invention, therefore, provides in certain, but not necessarily all embodiments, a vibratory separator for separating components of material introduced to the vibratory separator, the vibratory separator having a basket for holding screening apparatus, the basket having two sides spaced-apart by a first end at which the material is introduced into the basket and a second end spaced-apart from the first end, components separated from the material exiting the basket from the second end, vibrating apparatus connected to the basket for vibrating the basket, screening apparatus mounted in the basket, the screening apparatus having at least a first portion and a second portion, the first portion lower in the basket than the second portion, and receptacle apparatus below the screening apparatus for receiving material components flowing through the screening apparatus. Such a method may include one or some of the following, in any possible combination: wherein the first portion is at the first end of the basket; wherein the first end of the basket and parts of the two spaced-apart sides define a space in which a pool of the material is formable above the first portion of the screening apparatus; the screening apparatus having a third portion adjacent the basket's exit end, the third portion lower in the basket than the second portion; the screening apparatus having an exit end spaced apart from the first end of the basket, and a secondary screen at the second end of the basket, the secondary screen with a portion thereof disposed beneath the exit end of the screening apparatus so that material components flow from the screening apparatus onto the secondary screen; wherein the secondary screen is a substantially flat screen; wherein the secondary screen is a curved screen viewed from the side; wherein the secondary screen has a first secondary screen end and a second secondary screen end and the first secondary screen end is further away from the second end of the basket than the second secondary screen end; wherein the screening apparatus is curved when viewed from the side; a pool of material above the first portion of the screening apparatus; the pool extends across the basket from a first side of the basket to a second side of the basket at the first end and at any distance from the first end has a substantially similar depth from the first side of the basket to the second side of the basket; crown apparatus for maintaining height of a portion of the screening apparatus; wherein the crown apparatus has an inflatable bladder; wherein the inflatable bladder is selectively adjustable to adjust height of a portion of the screening apparatus; control apparatus to control adjustment of the inflatable, and monitor apparatus for monitoring height of a portion of the screening apparatus; the basket with a basket bottom opening between the two spaced-apart sides, at least one basket aperture not through the basket bottom, at least one aperture screen over the at least one basket aperture, and the at least one aperture screen and the bottom screening apparatus for separating a component material from the material introduced into the basket, material flowing through the at least one aperture screen not flowing through the bottom screening apparatus, the separated component material flowing into the collection receptacle; wherein the basket aperture is through the end wall; wherein the basket aperture is through one of the two spaced-apart side walls; and/or wherein the screening apparatus is two-dimensional.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A vibratory separator for separating components of material introduced to the vibratory separator, the vibratory separator comprising a basket for holding screening apparatus, the basket having two sides spaced-apart by a first end at which the material is introduced into the basket and a second end spaced-apart from the first end, components separated from the material exiting the basket from the second end, vibrating apparatus connected to the basket for vibrating the basket, screening apparatus mounted in the basket, the screening apparatus having at least a first portion and a second portion, the first portion lower in the basket than the second portion, receptacle apparatus below the screening apparatus for receiving material components flowing through the screening apparatus, pool of material formable above the first portion of the screening apparatus, the pool extendable across the basket from a first side of the basket to a second side of the basket at the first end and at any distance from the first end has a substantially similar depth from the first side of the basket to the second side of the basket, an inflatable bladder, the inflatable bladder selectively adjustable to adjust height of a portion of the screening apparatus, control apparatus to control adjustment of the inflatable bladder, and monitor apparatus for monitoring height of a portion of the screening apparatus.

2. The vibratory separator of claim 1 wherein the first portion is at the first end of the basket.

3. The vibratory separator of claim 1 further comprising the screening apparatus further comprising
a third portion adjacent the basket's exit end, the third portion lower in the basket than the second portion.

4. The vibratory separator of claim 1 further comprising the screening apparatus having an exit end spaced apart from the first end of the basket, and a secondary screen at the second end of the basket, the secondary screen with a portion thereof disposed beneath the exit end of the screening apparatus so that material components flow from the screening apparatus onto the secondary screen.

5. The vibratory separator of claim 4 wherein the secondary screen is a substantially flat screen.

6. The vibratory separator of claim 4 wherein the secondary screen is a curved screen viewed from a side.

7. The vibratory separator of claim 6 wherein the secondary screen has a first secondary screen end and a second secondary screen end and the first secondary screen end is further away from the second end of the basket than the second secondary screen and.

8. The vibratory separator of claim 1 wherein the screening apparatus is curved when viewed from a side.

9. The vibratory separator of claim 1 further comprising
crown apparatus for maintaining height of a portion of the screening apparatus.

10. The vibratory separator of claim 1 further comprising the basket further comprising
a basket bottom opening between the two spaced-apart sides,
at least one basket aperture not through the basket bottom,
at least one aperture screen over the at least one basket aperture, and
bottom screening apparatus,
a collection receptacle below the bottom screening apparatus,
the at least one aperture screen and the bottom screening apparatus for separating a component material from the material introduced into the basket, material flowing through the at least one aperture screen not flowing through the bottom screening apparatus, the separated component material flowing into the collection receptacle.

11. The vibratory separator basket of claim 1 wherein the basket has and end wall and the at least one basket aperture is through the end wall.

12. The vibratory separator of claim 1 wherein the at least one basket aperture is through one of the two spaced-apart side walls.

* * * * *